United States Patent
Jackson et al.

(10) Patent No.: US 9,992,344 B2
(45) Date of Patent: *Jun. 5, 2018

(54) SYSTEM AND METHOD FOR SELECTIVE VOICEMAIL TRANSCRIPTION

(71) Applicant: Nuance Communications, Inc., Burlington, MA (US)

(72) Inventors: James Jackson, Austin, TX (US); Philip Cunetto, Austin, TX (US); Mehrad Yasrebi, Austin, TX (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/850,082

(22) Filed: Sep. 10, 2015

(65) Prior Publication Data

US 2016/0006878 A1    Jan. 7, 2016

Related U.S. Application Data

(63) Continuation of application No. 14/531,572, filed on Nov. 3, 2014, now Pat. No. 9,137,375, which is a (Continued)

(51) Int. Cl.
*H04M 3/533* (2006.01)
*G10L 15/26* (2006.01)
(Continued)

(52) U.S. Cl.
CPC ......... *H04M 3/53366* (2013.01); *G10L 15/26* (2013.01); *H04M 3/5307* (2013.01);
(Continued)

(58) Field of Classification Search
CPC .................................................. H04M 3/53366
(Continued)

(56) References Cited

U.S. PATENT DOCUMENTS 5,659,599 A * 8/1997 Arumainayagam ....................... H04M 3/53325
379/67.1
5,859,898 A 1/1999 Checco
(Continued)

FOREIGN PATENT DOCUMENTS

EP    1104964    6/2001
EP    1696651    8/2006
(Continued)

*Primary Examiner* — Md S Elahee

(57) ABSTRACT

Disclosed herein are systems, methods, and non-transitory computer-readable storage media for selectively transcribing messages. Five general approaches are disclosed herein. The first approach is directed to checking for a transcription capable client, which transcribes messages when a client device is capable of receiving transcriptions. The second and third approaches are platform-controlled and user-controlled predefined selective transcription. One aspect of this approach is driven by transcription rules. The fourth approach is user-controlled on-demand selective transcription before the message is stored or deposited for transcription. An example of this is a user transferring an incoming caller to voicemail and indicating that the voicemail be transcribed. The fifth approach is user-controlled on-demand selective transcription after the message is stored. In one embodiment of this approach, a user must specifically request that a stored message be transcribed.

20 Claims, 5 Drawing Sheets

Related U.S. Application Data continuation of application No. 12/852,190, filed on Aug. 6, 2010, now Pat. No. 8,879,695.

(51) Int. Cl.
*H04M 3/53* (2006.01)
*H04M 15/00* (2006.01)

(52) U.S. Cl.
CPC ... *H04M 3/53333* (2013.01); *H04M 15/8011* (2013.01); *H04M 2201/40* (2013.01); *H04M 2201/60* (2013.01); *H04M 2203/459* (2013.01)

(58) Field of Classification Search
USPC ....... 379/88.01, 88.14, 93.01, 93.24, 201.02, 379/88.18, 566, 67.1, 88.11–88.13; 370/356; 455/566; 709/204
See application file for complete search history.

(56) References Cited

U.S. PATENT DOCUMENTS

| | | | |
|---|---|---|---|
| 6,529,587 B1 * | 3/2003 | Cannon | H04M 3/533 379/88.18 |
| 6,580,786 B1 | 6/2003 | Yarlagadda | |
| 6,625,142 B1 * | 9/2003 | Joffe | H04L 12/58 370/356 |
| 6,816,858 B1 | 11/2004 | Coden et al. | |
| 7,024,455 B2 | 4/2006 | Yokobori et al. | |
| 7,496,625 B1 * | 2/2009 | Belcher | H04L 51/066 709/204 |
| 7,522,712 B2 | 4/2009 | Inon | |
| 8,019,051 B1 | 9/2011 | Childs et al. | |
| 8,064,576 B2 | 11/2011 | Skakkebaek et al. | |
| 8,543,652 B2 | 9/2013 | Yasrebi et al. | |
| 2002/0002060 A1 * | 1/2002 | Singh | H04M 1/72522 455/566 |
| 2002/0029189 A1 | 3/2002 | Titus et al. | |
| 2002/0132611 A1 | 9/2002 | Immonen et al. | |
| 2003/0169865 A1 | 9/2003 | Oren | |
| 2003/0236845 A1 | 12/2003 | Pitsos | |
| 2004/0044749 A1 | 3/2004 | Harkin | |
| 2004/0083270 A1 | 4/2004 | Heckerman et al. | |
| 2004/0248563 A1 | 12/2004 | Ayers et al. | |
| 2006/0030297 A1 | 2/2006 | Coble et al. | |
| 2006/0031364 A1 | 2/2006 | Hamilton et al. | |
| 2006/0080354 A1 | 4/2006 | Berger et al. | |
| 2006/0195540 A1 | 8/2006 | Hamilton et al. | |
| 2006/0239188 A1 | 10/2006 | Weiss et al. | |
| 2007/0189520 A1 | 8/2007 | Altberg et al. | |
| 2007/0230476 A1 | 10/2007 | Ding | |
| 2007/0287463 A1 | 12/2007 | Wilson | |
| 2008/0034086 A1 | 2/2008 | Castelli et al. | |
| 2008/0147864 A1 | 6/2008 | Drogo De Iacovo et al. | |
| 2009/0010202 A1 | 1/2009 | Masayuki et al. | |
| 2009/0061828 A1 | 3/2009 | Sigmund et al. | |
| 2009/0086278 A1 | 4/2009 | Vendrow et al. | |
| 2009/0164588 A1 | 6/2009 | D'Amato et al. | |
| 2009/0164933 A1 | 6/2009 | Pederson et al. | |
| 2010/0057880 A1 | 3/2010 | Hasti et al. | |
| 2010/0125450 A1 | 5/2010 | Michaelangelo et al. | |
| 2010/0146057 A1 | 6/2010 | Abu-Hakima et al. | |
| 2010/0150322 A1 | 6/2010 | Yin et al. | |
| 2010/0185746 A1 | 7/2010 | Suh et al. | |
| 2011/0022387 A1 | 1/2011 | Hager | |
| 2012/0278160 A1 | 11/2012 | Ieong et al. | |

FOREIGN PATENT DOCUMENTS

| | | |
|---|---|---|
| JP | 02069043 | 3/1990 |
| JP | 09046421 | 2/1997 |
| JP | 2009245374 | 10/2009 |
| WO | WO 9719525 | 5/1997 |

\* cited by examiner

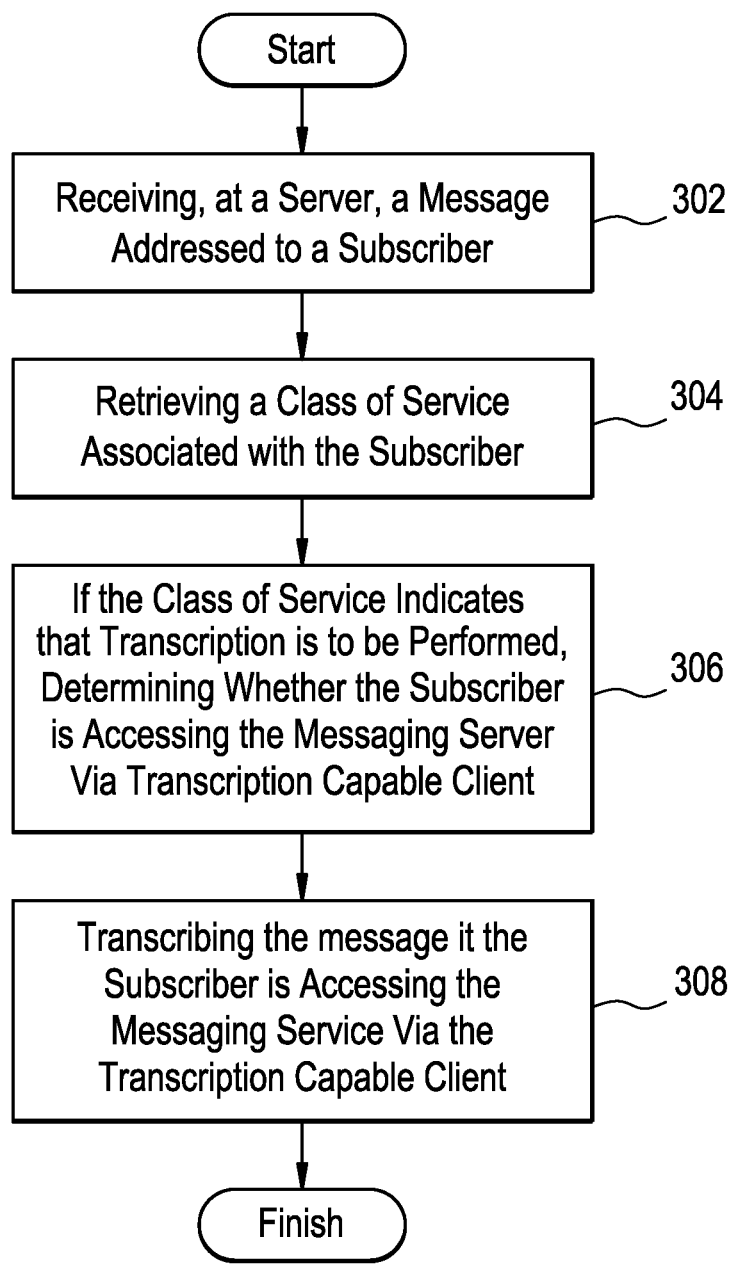

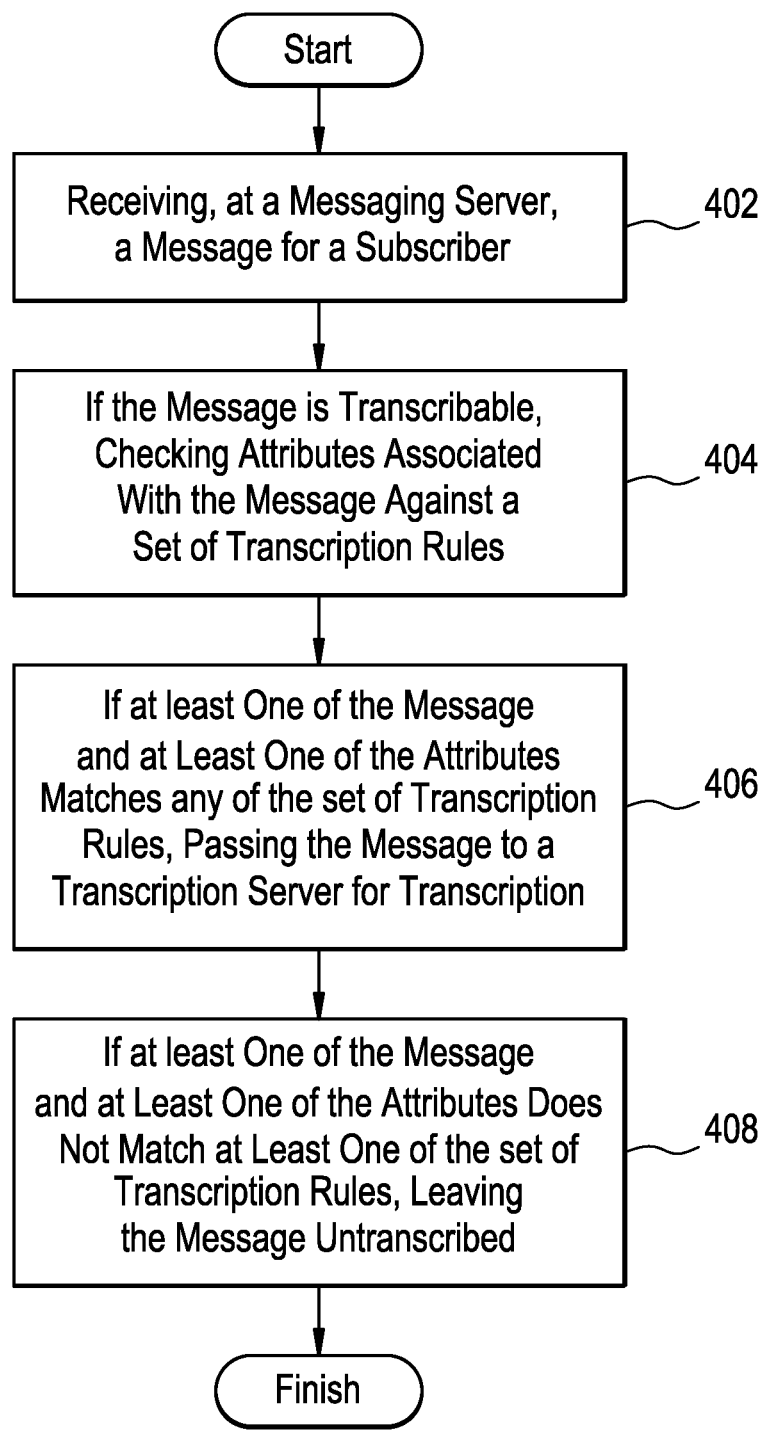

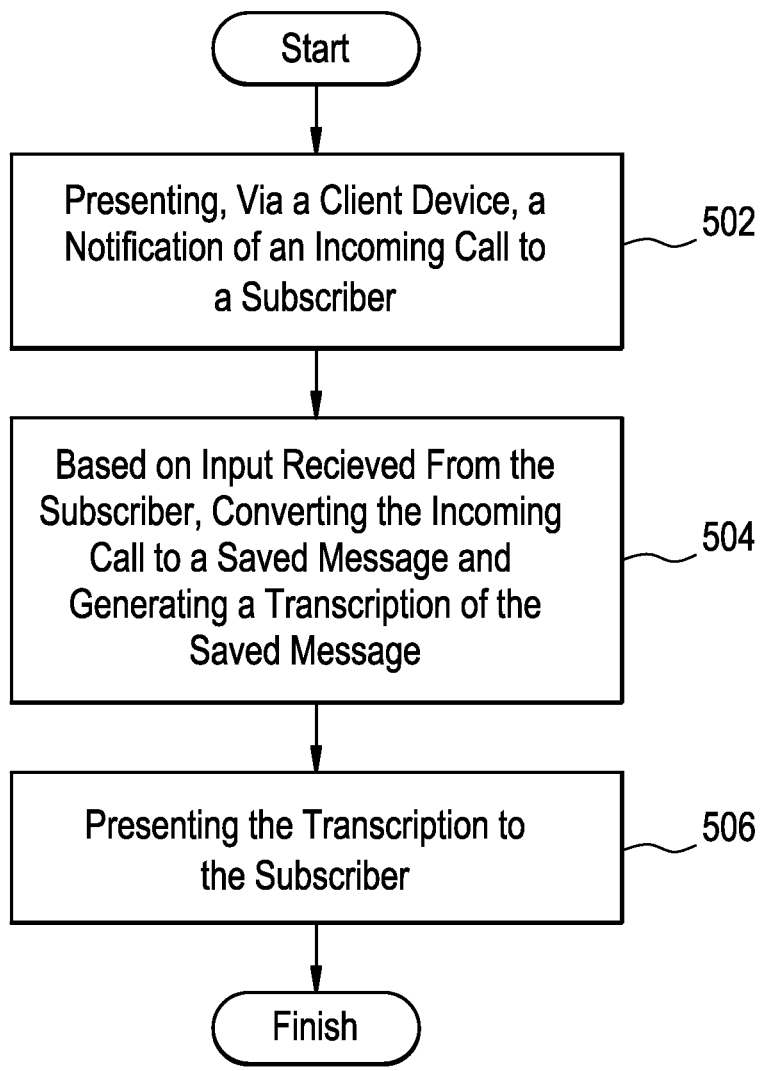

SYSTEM AND METHOD FOR SELECTIVE VOICEMAIL TRANSCRIPTION

PRIORITY INFORMATION

The present application is a continuation of Ser. No. 14/531,572, filed Nov. 3, 2014, which is a continuation of U.S. patent application Ser. No. 12/852,190, filed Aug. 6, 2010, now U.S. Pat. No. 8,879,695, issued Nov. 4, 2014, the content of which is incorporated herein by reference in its entirety.

BACKGROUND

1. Technical Field

The present disclosure relates to message transcriptions and more specifically to selectively transcribing messages in a messaging platform.

2. Introduction

Transcribing voicemails or other messages from multimedia forms such as video, images, and audio to text is a very resource intensive process that can require significant amounts of processing time, memory, disk space, and so forth. Many subscribers either do not have the ability to view transcriptions at the moment due to device-based limitations or they do not have desire to read view the transcriptions at that time or for that particular message. Further, certain subscribers simply do not access transcriptions regularly and prefer to listen to or view the original message instead of the transcription. In such cases, the resources spent to transcribe messages are effectively wasted and could have been allocated to process more urgent messages. This waste leads system designers to intentionally overdesign a transcription and messaging system and spend more money constructing such a system than is actually necessary.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for selectively transcribing messages. Five general approaches are disclosed herein. The first approach is directed to checking for a transcription capable client, which transcribes messages when a client device is capable of receiving transcriptions and when an associated class of service indicates that transcriptions should be performed. The second approach is platform-controlled predefined selective transcription and the third approach is user-controlled predefined selective transcription. One aspect of this approach is driven by transcription rules. The fourth approach is user-controlled on-demand selective transcription before the message is stored or deposited for transcription. An example of this is a user transferring an incoming caller to voicemail and indicating that the voicemail be transcribed. The fifth approach is user-controlled on-demand selective transcription after the message is stored. In one embodiment of this approach, a user must specifically request that a stored message be transcribed. These approaches can be used separately, in combination with each other, and/or with other transcription optimization techniques.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a first example method embodiment;

FIG. 4 illustrates a second example method embodiment; and

FIG. 5 illustrates a third example embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for prioritizing and selectively transcribing messages. Some introductory principles and concepts are discussed first, followed by a brief description of a basic general purpose system or computing device in FIG. 1 which can be employed to practice the concepts is disclosed herein. A more detailed description of a unified messaging platform and the various methods will then follow.

Transcribing a voicemail from audio to text is a very resource intensive process, requiring significant amounts of processor time, memory, storage, and so forth. This disclosure provides a framework for optimizing resource utilization and thereby reducing costs, through selective transcription mechanisms. This ensures that transcriptions are only performed when necessary. Five major types of selective transcription disclosed herein include (1) a transcription-capable client check, (2) platform-controlled predefined selective transcription, (3) user-controlled pre-defined selective transcription, (4) user-controlled on-demand selective transcription (pre-deposit), and (5) user-controlled on-demand selective transcription (post-deposit). These five types of selective transcription shall be discussed herein as the various embodiments are set forth. The disclosure now turns to FIG. 1.

Figure 1:
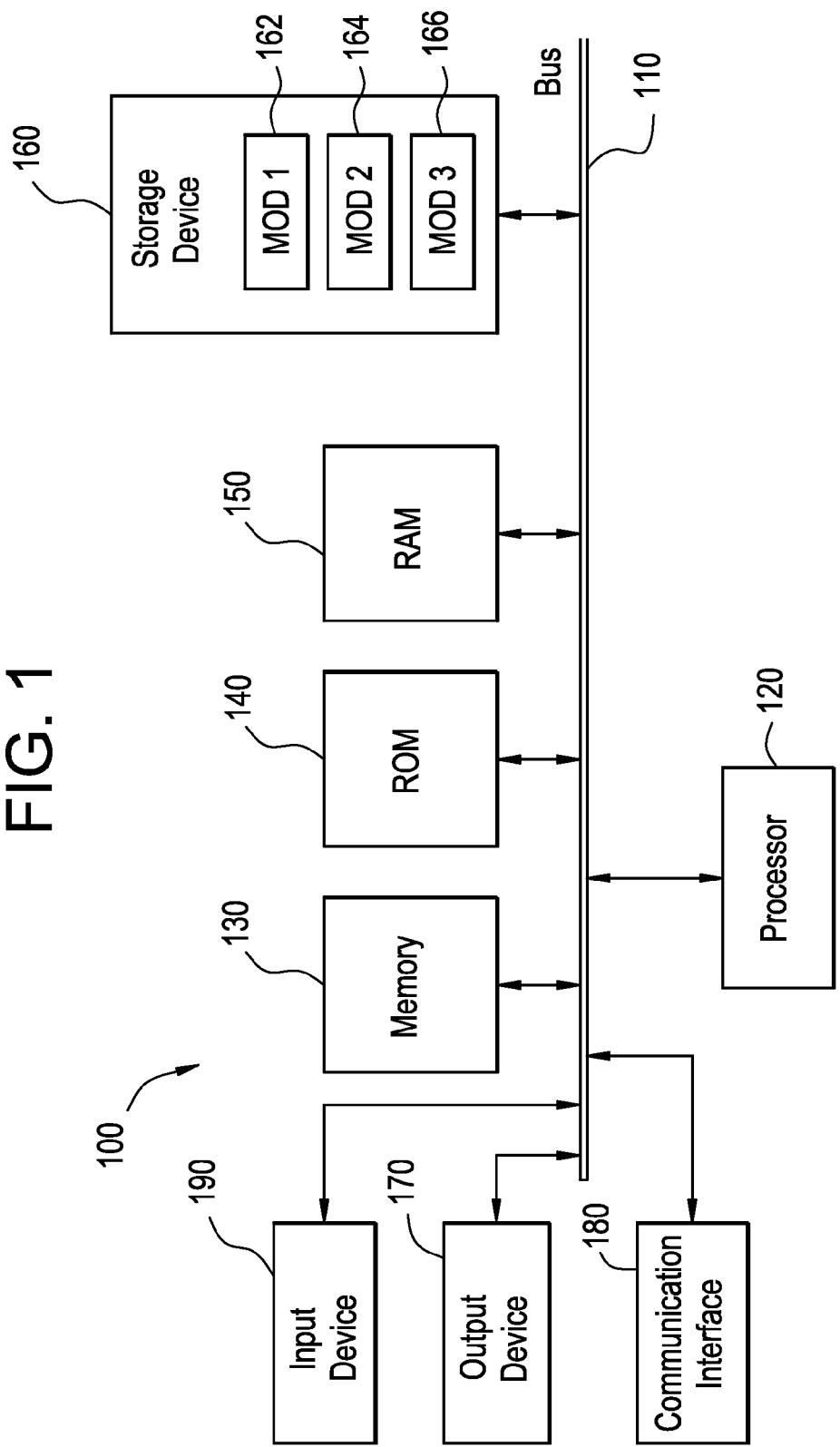
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache (not shown) of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, output device (e.g., display) 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer-implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which can be modules configured to control the processor 120. These modules may be stored on the storage device 160 and loaded into RAM 150 or memory 130 at runtime or may be stored as would be known in the art in other computer-readable memory locations.

Figure 2:
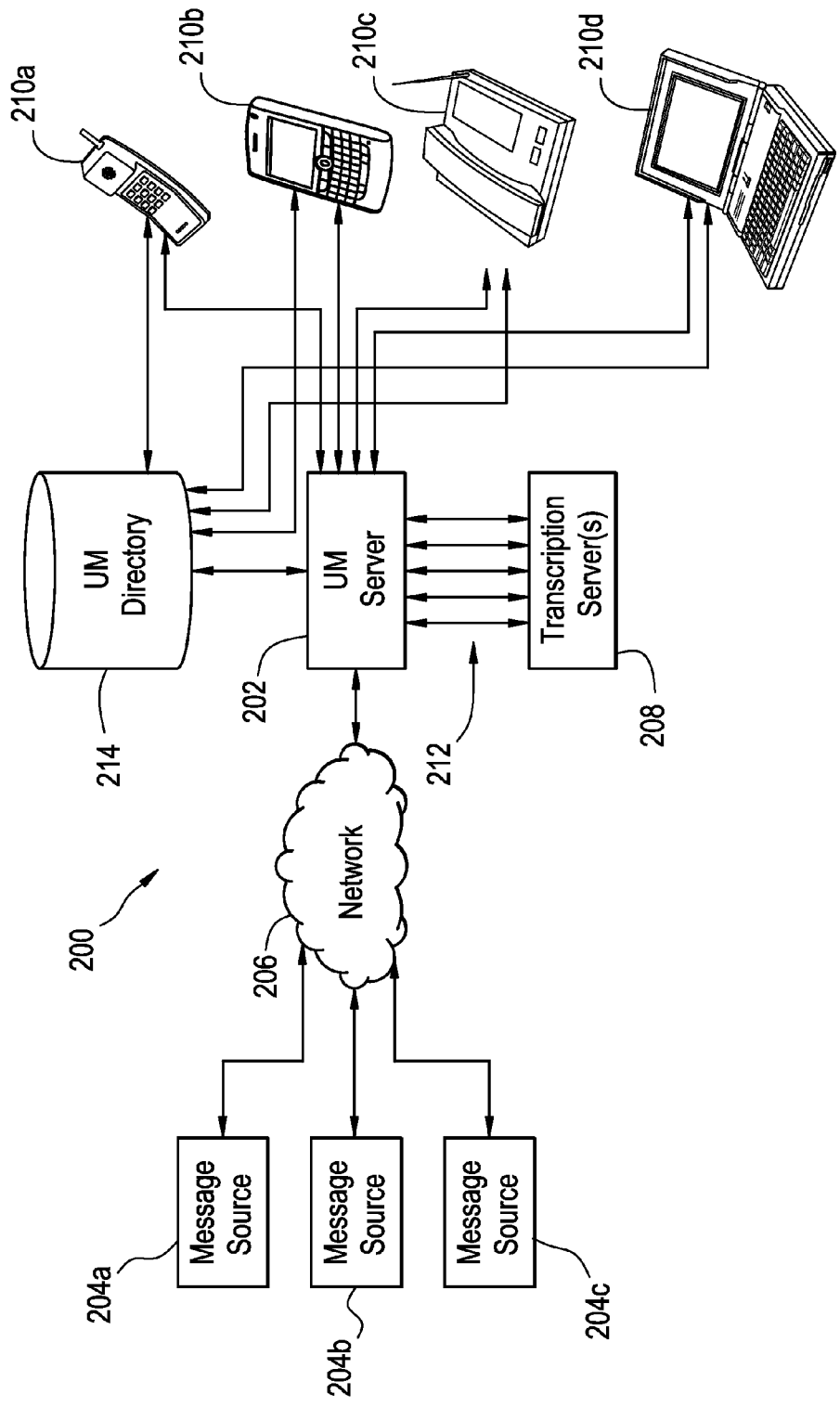
FIG. 2 illustrates an example unified messaging (UM) server and UM client configuration.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

The disclosure now turns to FIG. 2 which illustrates an example overview 200 of a unified messaging (UM) server 202 and UM client configuration with a diversity of clients, such as a limited display device 210A, a smartphone 210B, a telephone with no display 210C, and a personal computer 210D. The UM server 202 and/or UM clients 210A, 210B, 210C, 210D can include all or part of the elements of the exemplary system 100 shown in FIG. 1. The UM server 202 receives messages from multiple message sources 204*a*, 204*b*, 204*c* via a communication network 206, such as the public switched telephone network or the Internet. The message sources can provide message such as voicemails, video messages, faxes, images, multimedia messages, and/or hyperlinks.

When the UM server 202 receives messages, the UM server 202 can identify a recipient (also called user or subscriber herein) of the message and retrieve a subscriber profile from a UM directory 214, and can store the message in the subscriber's mailbox (not shown). The subscriber profile can provide information about a class of service for the subscriber. For example, one subscriber can pay a premium fee for real-time transcription service, another subscriber can pay a lower fee for a first non-real-time transcription service that indicates a preference for a short transcription time, but the short time is not guaranteed, and a third subscriber can use a second non-real-time transcription service for free that has no preference for a transcription delay. The UM server 202 can send non-text contents of messages (e.g., voice messages) to the transcription server(s) 208 to be transcribed (converted to text messages). Content to be transcribed is referred to as raw-media content herein for conciseness. In at least one embodiment, the UM server 202 transmits raw content to the transcription server(s) 208 after receiving a complete message, which contains one or more raw content(s). In another embodiment, the UM server 202 transmits raw content to the transcription server(s) 208 even if the UM server 202 has not received the entire message. While waiting to be transcribed, non-real-time raw contents can be deposited in a queue internal to the UM server 202, a queue internal to the transcription server(s) 208, and/or a queue external to both the UM server 202 and the transcription server(s) 208. In one case, multiple non-real-time queues can distinguish between different classes of non-real-time transcriptions.

The UM directory 214 can store additional classes of service beyond the exemplary classes of service discussed herein. In one aspect, a hybrid class of service provides a different class of service based on time, location, subscription, date, and other user parameters. For example, a hybrid class of service for an accountant may indicate a real-time class of service on weekdays which are not federal holidays between 8:00 a.m. and 6:30 p.m. and a no preference class of service all other times. In another example, a salesman can indicate that all incoming messages from phone numbers or emails originating from a group of client companies are associated with a real-time transcription class of service and all other messages are associated with a class of service which prefers but does not require a short transcription time. Other variations and classes of service can be applied.

In one aspect, the UM directory 214 or another component (not shown) associated with the UM server 202 also provides information to the UM server 202 related to the probability of messages being accessed in the near term. If the user receives and accesses a new message notification while the message transcription is pending, the UM server 202 can increase the probability that the message will be accessed in the near term. If the user receives the new message notification indicating to the user that he/she has received a new message in his/her mailbox on the UM server 202, but the user does not access the message, the UM server 202 can lower the probability or leave it unchanged. The probability of near-term access can be based on historical statistics for subscriber message/transcription access times, such as the average time between new message notification and transcription access. The average time can be per-user for a very granular average for a particular user or can be averaged for similar customers. For example, the average time between new message notification and message access can be calculated for males from ages 18-25 in Florida, for Asian females in the Rocky Mountains, or for college students nationwide.

The probability of near-term access can further be based on subscriber presence information. Presence information can convey a user's available capacities to communicate. For example, presence can indicate whether a user is available or not, whether a user can accept a video feed or not, the user's physical location, which specific communication devices the user has available, and so forth. Presence can also indicate a user's willingness to accept communications. For example, a user presence can indicate "do not disturb", "in a meeting", or "available". Presence information can be automatically generated (e.g., based on communications with other components, some of which are not shown) or manually set by the user. In one configuration, the UM directory 214 receives subscriber presence information from UM clients 210A, 210B, 210C, 210D and/or components that directly and/or indirectly communicate with such clients and bases the probability of messages being accessed in the near term on that presence information. Presence information can be gleaned from one source or from multiple sources, such as web browser logins, smartphone applications, GPS signals, calendar events, and so forth. Furthermore, presence information can also be determined from activities and/or login status of subscribers using the sample devices for UM clients 210a, 210b, 210c, and 210d.

Other potentially relevant factors to the probability of near-term access can include message parameters, such as indicators of message urgency, and message meta-data, such as a message source or message title (where available). The UM server 202 can also dedicate more resources to subscribers that have historically received higher confidence transcriptions from the transcription server(s) 208 for their raw messages.

The UM server 202 communicates with a transcription server(s) 208 which transcribe all or part of each message from the message sources via a finite number of communication channels 212. The finite number of communication channels can be divided into multiple groups (not shown). For example, a first group of communication channels associated with a first group of transcription servers can handle real-time transcriptions and a second group of communication channels associated with a second group of transcription servers can handle non-real-time transcriptions. The transcription server 208 can transcribe messages using speech to text, OCR, pattern recognition, and/or any other suitable mechanism(s) to extract text from non-textually formatted messages or raw content. The transcription server 208 can also perform translation services to translate extracted text from one language to another, if needed. The UM server 202 can then offer an original language transcription and a translated transcription to the UM client. The UM server 202 identifies a particular UM client 210A, 210B, 210C, 210D for each message and transmits information to the respective UM client regarding the message, including a transcription status. In the case of a voicemail, the UM server 202 can transmit information indicating a sender of the voicemail, a duration of the voicemail, a callback number, a time of the voicemail, a "headline" of the voicemail transcription and so forth.

Some example UM clients include smartphones, PDAs, cellular phones, web browsers, mobile phone applications, a personal computer, an intermediate UM server, an IPTV set top box, and so forth. Additional types of client devices can be used as well, all of which are not shown in FIG. 2. When a UM client establishes a session with the UM server 202, the UM server 202 can return a listing of messages and, possibly, transcription progress for messages in the listing. If the UM server 202 receives progress updates from the transcription server(s) 208, such as a revised expected completion time or a completed transcription, from the transcription server 208, the UM server 202 can transmit updated notifications to the appropriate UM client device.

Having disclosed some basic system components and an exemplary unified messaging server and client configuration, the disclosure now turns to a discussion of five types of selective message transcription. The first type of selective message transcription is checking for a transcription-capable UM client. Before transcription is enabled for a subscriber, the UM server 202 retrieves a Class-of-Service (CoS), such as from a UM directory 214, for the subscriber to ensure that transcription is allowed. If the subscriber's CoS allows transcription, the UM server 202 proceeds to determine, where possible, whether the subscriber is currently accessing the UM server 202 via a transcription-capable device, such as a device capable of displaying text. Some examples of such devices include a smartphone 210b and a personal computer 210d. Certain devices, such as a plain telephone 210a, do not have any display capabilities and are thus not transcription-capable. Some devices have limited ability to display text, such as a desktop phone 210c having a display capable of showing only a single, short line of characters. Depending on these display capabilities, the device may or may not qualify as transcription-capable. The UM server 202 can track user logins from specific clients, client types, client versions, client identifications, and so forth. In one embodiment, the UM server 202 tracks a source of the last "getMessageTranscription" application programming interface (API) call from UM client applications on behalf of each subscriber. For example, the API call may include a fingerprint of the requesting client device that can identify the device type. The server 202 can then look up in a table whether that device type is transcription capable. Alternately, the API call can include a flag indicating whether a device is transcription capable or not.

In one variation, if the last "getMessageTranscription" API call occurred within the last N days, then the UM server 202 enables transcription. N can be a CoS configurable attribute, allowing different values to be used for different subscribers. The current state of transcription may be stored in an attribute in the UM Directory 214. Whenever the "transcription capable" state changes for a particular user, the UM server 202 can update such information in the UM server 202 and/or the UM directory 214 for that user.

The second type of selective transcription is platform-controlled pre-defined selective transcription. In this type, the UM server 202 is configured to act based on pre-defined transcription exceptions. The transcription exceptions can be applied globally or can be associated with a particular subscriber and/or CoS. The UM directory 214 can store these exceptions. Exceptions can take the form of a ruleset that determines when transcriptions should be skipped that would otherwise be performed. A ruleset can include one or more rules to skip entirely or change priorities of transcriptions such as "skip transcription for any messages greater than 1 min in length" or "skip transcription if subscriber currently has more than 4 transcriptions pending". Rulesets can also include positive rules regarding which types of messages should always be transcribed.

The third type of selective transcription is user-controlled pre-defined selective transcription. In one variation of this approach, the UM directory 214 and/or the UM server 202 provide a subscriber interface to allow subscribers to adjust the details of each rule and to adjust the order in which the rules are applied to messages for that subscriber. Subscriber settings in the UM platform 200 are updated to reflect new pre-defined options for transcription. Some exemplary options and rules include "skip transcription if the sender of the message is not an approved contact", "assign a low priority to transcriptions for messages left between midnight and 7:30 a.m.", "transcribe messages from unknown callers", "transcribe message from callers present in my address book", "transcribe message from callers not present in my address book", "transcribe messages marked urgent", "transcribe messages with a read receipt request", and "transcribe messages from callers in the Legal department". User-controlled rules can be conditional, such as based on a client device state, a user location, a current user activity, calendar events, and so forth. The conditional rules can depend on multiple user-dependent or user-independent factors. User-controlled rules can be applied in addition to CoS rules or can be overridden by conflicting CoS rules and/or exceptions.

The fourth type of selective transcription is pre-deposit, user-controlled, on-demand selective transcription. This supports scenarios in which the subscriber is presented with an enhanced call handling interface, such as an enhanced graphical interface on a smartphone, IPTV, or softphone. Upon receiving a new call, the subscriber chooses an option to "forward to voicemail and provide a transcription". The UM platform 200 is enhanced to support receipt and processing of a new parameter in call signaling. Alternately, the UM server 202 can communicate with client devices 210a, 210b, 210c, 210d via a separate data channel such as a web services API channel. This parameter indicates the specific feature that is being requested. For example, when a call is forwarded to voicemail, the system can associate a redirecting reason code with the redirecting number. In Session Initiation Protocol (SIP), this can be the reason code associated with a SIP diversion header, a cause code associated with a Voicemail URI, and so forth.

The fifth type of selective transcription is a post-deposit, user-controlled, on-demand selective transcription. When this is enabled in a subscriber's CoS, no messages are automatically transcribed. Instead, the subscriber must specifically request transcription of a message. This approach can rely on additional functionality via a new API call to the UM server 202 such as a "TranscribeMessages([arrays of message-numbers]) API call, whereby a client device to the UM server 202 can request that the UM server 202 initiate transcription for a particular message or a group of messages. This can lead to modification of systems which automatically transcribe all messages or no messages.

This approach is not limited to only subscribers that have on-demand transcription service. The TranscribeMessages API call can include implied and/or explicitly-requested limits on the maximum number of simultaneously pending transcriptions for a given subscriber to ensure that a client does not request transcription for a large number of previously untranscribed messages in a short interval.

The approaches set forth herein can reduce the hardware cost for a unified messaging platform 200 and can improve scalability of the platform by ensuring that transcriptions are only performed when subscribers are actively using transcription-capable clients. The unified messaging platform 200 can allow pre-defined and on-demand voicemail transcription and reduce the possibility of delays in voicemail transcription to improve the customer experience.

The disclosure now turns to the exemplary method embodiments of these types of selective transcription. FIG. 3 illustrates a first example method embodiment for selectively transcribing messages. The method is discussed in terms of a system configured to practice the method, such as system 100 shown in FIG. 1. The system 100 receives, at a messaging server, such as the UM server 202 of FIG. 2, a message addressed to a subscriber (302) and retrieves a class of service associated with the subscriber (304). Then, if the class of service indicates that transcription is to be performed, the system 100 determines whether the subscriber is accessing the messaging server via a transcription capable client (306). The system 100 transcribes the message if the subscriber is accessing the messaging server via the transcription capable client (308). A transcription server separate from or incorporated into the system 100 can transcribe the message. In one variation, the system 100 transcribes the message if the messaging server has received a request for a transcription from the subscriber within a threshold time. The threshold time can be associated with the class of service. The system 100 can optionally identify a current transcription state for the subscriber, store the current transcription state in a subscriber directory, and notify the subscriber when the current transcription state changes.

FIG. 4 illustrates a second example embodiment for selectively transcribing messages. The system 100 receives, at a messaging server, such as the UM server 202 of FIG. 2, a message for a subscriber (402) and checks attributes associated with the message against a set of transcription rules if the message is transcribable (404). The attributes can include, for example, the type of the message, the raw content of the message, a sender of the message, a category of the sender of the message, a contact list of the subscriber, a priority marking of the message, and a request for a read receipt. Other attributes include any information which describes any single aspect or multiple aspects of the message, its sender, or any other associated entities.

The set of transcription rules can include a set of transcription exceptions. The set of transcription rules can be retrieved from a directory of user accounts. Each user's account can include a set of transcription rules and the user's class of service can indicate additional transcription rules to apply. Transcription rules can include transcription exceptions which define messages having a certain attribute or pattern of attributes that are not to be transcribed automatically. A user can explicitly define one or more transcription rules, or the system can infer and automatically generate transcription rules by observing user behavior. In one aspect, the transcription rules are not based solely on attributes of the message or the sender, but also on factors external to the message. For example, one of the transcription rules can be based on a threshold of the number of currently pending transcriptions.

If at least one of the message and at least one of the attributes matches any of the set of transcription rules, the system 100 passes the message to a transcription server for transcription (406), and if at least one of the message and at least one of the attributes does not match at least one of the set of transcription rules, the system 100 leaves the message untranscribed (408).

FIG. 5 illustrates a third exemplary method embodiment for selectively transcribing messages. The system 100 presents, via a UM client device, a notification of an incoming call to a subscriber (502). The notification can be presented in real time simultaneously with the incoming call. The notification can be presented to the user (UM subscriber) via an enhanced interface. The system 100 converts the incoming call to a saved message based on input received from the subscriber and generates a transcription of the saved message (504). Converting the incoming call can optionally be performed based on input received from the subscriber in response to the notification. The system 100 can also assign the transcription a reason code and/or a redirecting number received from the subscriber via a separate data channel. The reason code can be associated with a Session Initiation Protocol (SIP) diversion header and/or a cause code associated with a voicemail Uniform Resource Identifier (URI). The system 100 presents the transcription to the subscriber (506). The system 100 can present the transcription via one or more communication medium, such as a text message, an image of the transcribed text, an email, a tweet, and so forth.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
presenting, via a client device, a notification of an incoming call to a subscriber;
receiving, while presenting the notification, an input from the subscriber with regard to the incoming call, wherein the input is associated with instructions to:
(1) transfer the incoming call to a voicemail system; and
(2) when the incoming call results in a voicemail at the voicemail system,
transcribe the voicemail into text;
transferring, based on the input, the incoming call to the voicemail system to yield the voicemail;
determining whether a current time is within a first time window associated with a first class of service or a second time window a second class of service to yield a determined class of service according to the current time;
generating, based on the determined class of service according to the current time, a transcription of the voicemail, the transcription comprising text generated from the voicemail; and
presenting the transcription on a device of the subscriber.

2. The method of claim 1, wherein the transferring of the incoming call and the generating of the transcription are further based on a class of service associated with the subscriber.

3. The method of claim 2, wherein the class of service is one of a plurality of classes of service, each class of the plurality of classes of service having a distinct functionality and cost, wherein the cost requires a premium for a threshold time.

4. The method of claim 1, further comprising:
identifying a current transcription state of the voicemail for the subscriber;
storing the current transcription state in a subscriber directory; and
notifying the subscriber when the current transcription state changes.

5. The method of claim 1, wherein the transferring of the incoming call and the generating of the transcription are performed by the client device.

6. The method of claim 1, further comprising, prior to the generating of the transcription, comparing the voicemail to a set of transcription rules to determine if the voicemail should remain untranscribed.

7. The method of claim 1, wherein the first time window and the second time window do not overlap and cover a consecutive twenty-four hours.

8. A system comprising:
a processor; and
a computer-readable storage device having instructions stored which, when executed by the processor, cause the processor to perform operations comprising:
presenting, via a client device, a notification of an incoming call to a subscriber;
receiving, while presenting the notification, an input from the subscriber with regard to the incoming call, wherein the input indicates to:
(1) transfer the incoming call to a voicemail system; and
(2) when the incoming call results in a voicemail at the voicemail system, transcribe the voicemail into text;
transferring, based on the input, the incoming call to the voicemail system;
determining whether a current time is within a first time window associated with a first class of service or a second time window a second class of service to yield a determined class of service according to the current time;
generating, based on the determined class of service according to the current time, a transcription of the voicemail, the transcription comprising text generated from the voicemail; and
presenting the transcription on a device of the subscriber.

9. The system of claim 8, wherein the transferring of the incoming call and the generating of the transcription are further based on a class of service associated with the subscriber.

10. The system of claim 9, wherein the class of service is one of a plurality of classes of service, each class of the plurality of classes of service having a distinct functionality and cost, wherein the cost requires a premium for a threshold time.

11. The system of claim 8, the computer-readable storage device having additional instructions stored which, when executed by the processor, cause the processor to perform operations comprising:
identifying a current transcription state of the voicemail for the subscriber;
storing the current transcription state in a subscriber directory; and
notifying the subscriber when the current transcription state changes.

12. The system of claim 8, wherein the transferring of the incoming call and the generating of the transcription are performed by the client device.

13. The system of claim 8, the computer-readable storage device having additional instructions stored which, when executed by the processor, cause the processor to perform operations comprising, prior to the generating of the transcription, comparing the voicemail to a set of transcription rules to determine if the voicemail should remain untranscribed.

14. The system of claim 8, wherein the transcription occurs via a hybrid transcription service comprising a first class of service for a time window and a second class of service for a remainder time window, and wherein the time window and the remainder time window do not overlap and cover a consecutive twenty-four hours.

15. A computer-readable storage device having instructions stored which, when executed by a computing device, result in the computing device performing operations comprising:
presenting, via a client device, a notification of an incoming call to a subscriber;
receiving, while presenting the notification, an input from the subscriber with regard to the incoming call, wherein the input is associated with instructions to:
(1) transfer the incoming call to a voicemail system; and (2) when the incoming call results in a voicemail at the voicemail system,
transcribe the voicemail into text;
transferring, based on the input, the incoming call to the voicemail system to yield the voicemail;
determining whether a current time is within a first time window associated with a first class of service or a second time window a second class of service to yield a determined class of service according to the current time;
generating, based on the determined class of service according to the current time, a transcription of the voicemail, the transcription comprising text generated from the voicemail; and
presenting the transcription on a device of the subscriber.

16. The computer-readable storage device of claim 15, wherein the transferring of the incoming call and the generating of the transcription are further based on a class of service associated with the subscriber.

17. The computer-readable storage device of claim 16, wherein the class of service is one of a plurality of classes of service, each class of the plurality of classes of service having a distinct functionality and cost, wherein the cost requires a premium for a threshold time.

18. The computer-readable storage device of claim 15, having additional instructions stored which, when executed by the computing device, cause the computing device to perform operations comprising:
identifying a current transcription state of the voicemail for the subscriber;
storing the current transcription state in a subscriber directory; and
notifying the subscriber when the current transcription state changes.

19. The computer-readable storage device of claim 15, wherein the transferring of the incoming call and the generating of the transcription are performed by the client device.

20. The computer-readable storage device of claim 15, having additional instructions stored which, when executed by the computing device, cause the computing device to perform operations comprising, prior to the generating of the transcription, comparing the voicemail to a set of transcription rules to determine if the voicemail should remain untranscribed.

\* \* \* \* \*